Reissued Mar. 4, 1947

Re. 22,849

UNITED STATES PATENT OFFICE 22,849

STABILIZED LUBRICANTS

Norman D. Williams, Chicago, and William J. Backoff, Elmhurst, Ill., assignors to The Pure Oil Company, Chicago, Ill., a corporation of Ohio No Drawing. Original No. 2,375,060, dated May 1, 1945, Serial No. 569,628, December 23, 1944. Application for reissue October 18, 1945, Serial No. 623,154

18 Claims. (Cl. 252—32.7)

This application is a continuation-in-part of our co-pending application Serial No. 424,792 filed December 29, 1941, entitled Stabilized lubricants.

This invention relates to lubricating oils and more particularly to lubricating oil compositions containing oil soluble improving agent or agents effective to retard deterioration of lubricants and to inhibit or mitigate the normal corrosive action of lubricating oil or the deterioration products thereof upon metals, particularly bearing metals, under conditions of use, such improving agents also having the properties of increasing "oiliness" as well as imparting extreme pressure characteristics and depressing the pour test of mineral lubricating oils.

Although many technological advances have been made in the art of refining and applying lubricating oils and in the composition of bearing materials, modern lubricating oils and bearings often fail to perform satisfactorily. It is well known in the art that straight petroleum lubricants have fairly well defined limits of bearing speeds, pressures and temperatures within which they will give acceptable service. These limitations are often exceeded in modern engineering design, resulting in machines that cannot be satisfactorily lubricated by straight mineral oils. When the aforementioned limitations are exceeded, the rate of deterioration of the lubricating oils is materially increased resulting in oxidation products of a troublesome nature. Some of these oxidation products, such as highly resinous insoluble bodies, known as insoluble sludge, deposit in the hot portions of the engine thereby causing faulty ring action as well as causing bearing failures by depositing in the ducts of small diameter through which the oil normally flows to the bearings. These modern designs are justified by engineers in their efforts to provide machines to conform to the ever-increasing demand for compactness, speed, power and acceleration in modern engines. Many modern machines have already exceeded the above-mentioned limits wherein straight petroleum lubricating oils perform acceptably; therefore, it is necessary to provide lubricating compositions that extend and widen the limits formerly associated with straight lubricating oils.

Moreover, highly paraffinic oils having excellent viscosity-gravity constants, volatilities, carbon residue values, and resistance to sludging and oxidation and hence of high value for use under relatively mild lubricating conditions, sometimes tend to be even less satisfactory than the less highly paraffinic oils, when the ordinary limits of temperature, pressure, and bearing speed are exceeded. This may be due in part to the fact that the deterioration products of paraffinic constituents are more active than those resulting form naphthenic or other non-paraffinic constituents, and it may be due also to the fact that the non-paraffinic constituents have some inhibiting effect upon either the deterioration of the paraffinic constituents or upon the behavior of products resulting from such deterioration, at high temperatures and pressures, and in the presence of certain metals. However, the inhibiting value of the nonparaffinic constituents is low per unit concentration, and they are less satisfactory with respect to viscosity-gravity constant, carbon residue, and similar criteria of lubricating quality than the paraffinic constituents. A desirable solution of the problem would be to substitute for the non-paraffinic constituents removed in the more drastic refining treatments or absent because of the highly paraffinic nature of the original stock, some inhibiting or mitigating agent which would be far more effective per unit concentration and hence less detrimental with respect to the other physical properties which also effect the ultimate lubricating value of the oil.

Improved bearing metals have recently been developed which are mechanically advantageous under many operating conditions. These bearing metals include binary and ternary alloys of cadmium, silver, copper, lead and nickel, as examples of such improved bearing metals frequently employed at the present time may be mentioned cadmium-silver, cadmium-silver-copper, cadmium-nickel-copper, and copper-lead-alloys. However, such alloys are more subject to chemical attack than babbitt and other bearing alloys used in the past, and their use at high temperatures, high speeds and high pressures is sometimes accompanied by a deterioration of the oils employed for their lubrication, which in turn may destroy the bearings. The exact mechanism of this action is complicated and is perhaps not fully understood; it is quite possible that some of the metals present in the bearings tend to promote such deterioration, and that other metals or the same metal, are subject to attack from the deterioration products. Whatever the cause of the action may be, the result is that the combination of drastic lubricating conditions and alloy bearings of the general nature indicated, frequently causes trouble; the bearings may be badly etched or corroded, and the quality of the oil may be rapidly deteriorated. It is highly desirable, therefore, to provide means whereby the oils may be so improved as to give satisfactory operating results under the conditions noted, and this is especially true insofar as concerns the more highly paraffinic oils, which should and do command a premium in price. Moreover, it is well known that all hydrocarbon oils are more or less subject to changes through oxidation resulting in undesirable deterioration, acid formation, and increase in carbon residue, viscosity, sludging and the like. Such oxidation changes may become more rapid or more far-reaching in extent in the presence of metals such as those employed in modern bearings, for example, those of the general class mentioned above.

In order to meet these problems and to provide more satisfactory lubrication under the conditions indicated, various improvement agents have been incorporated in hydrocarbon oils prior to their sale and use. A primary requisite of such agents is good oil-solubility under service and marketing conditions and since solubilities vary in different types of oils, the improvement agent should be soluble in the requisite amount in oils of different types.

It is an object of this invention to provide a novel improving agent for lubricating compositions.

It is another object of this invention to provide a lubricating oil suitable for use in internal combustion engines which oil is inhibited against oxidation deterioration, varnish formation and bearing corrosion.

It is a further object of this invention to provide multi-functional mineral lubricating oil additive agents which have the property of inhibiting oxidation deterioration, reducing the corrosive and ring-sticking tendencies, improving the oiliness, imparting extreme pressure properties and reducing the pour test of the mineral lubricating oils in which such additives are incorporated.

Other objects of the invention will become apparent from the following detailed description.

It has now been found that improving agents for lubricating compositions, particularly mineral lubricating oils which have the property of inhibiting oxidation deterioration, reducing the corrosive and ring-sticking tendencies, improving oiliness, imparting extreme pressure properties and reducing the pour test, may be obtained by chemically reacting a phosphorus sulfide and one or more metal compounds with fatty body to form phosphorus and sulfur-bearing metal soaps. Such improving agents are particularly effective for simultaneously effecting substantial reductions in the corrosive tendency and oxidation deterioration, as indicated by sludge or varnish formation, in mineral lubricating oils. Fatty bodies which fall within classes IV, VII, VIII, IX, X and XII of the table entitled "Constants of vegetable and animal oils, fats and waxes," found on page 862 of the Handbook of Chemistry and Physics, 23rd edition, published by the Chemical Rubber Publishing Company, are suitable for the preparation of additives within the scope of this invention. The fatty bodies are therein classified as non-drying animal oil, fish and marine animal oil, vegetable fat, animal fat, sperm oil and animal wax, respectively. Examples of suitable fatty bodies include beef tallow, wool grease, menhaden oil, corn oil, soya bean oil, palm oil, oleic acid, sperm oil and lard oil. The preferred materials are neutral fats, which are known to consist substantially entirely of neutral esters in contrast to those fatty bodies which contain high proportions of fatty acids. While the neutral fats have been found to produce additive agents having unusually effective properties, the most uniformly superior results have been obtained with those additives prepared from wool grease.

Generally speaking, the phosphorus sulfide treated fatty bodies may be saponified with any one or more of a wide variety of metal compounds. However, the saponification products resulting from the use of metals of group 2 of the periodic table are superior additives, particularly from the metals calcium, strontium, barium and magnesium. Tin and lead soaps are also highly efficacious.

Phosphorus sesquisulfide, $P_4S_3$, has been found to be the most suitable phosphorus sulfide, although any other phosphorus sulfide such as phosphorus pentasulfide, $P_2S_5$, may be employed. The unusual results obtained by the use of additives within the scope of this invention are generally attributed to the particular chemical structure of the additives, which structure may only be obtained by the use of phosphorus sulfides. As a result of much investigation, it has been definitely established that fatty bodies which have been separately reacted with sulfur and/or phosphorus compounds thereof, other than phosphorus sulfide, are not the equivalent of the materials herein described and which are obtained by chemically reacting fatty bodies with phosphorus sulfide.

The metal soaps of the invention are preferably prepared by contacting an appropriate phosphorus sulfide such as phosphorus sesquisulfide, with fatty body at temperatures of the order of 150 to 400° F. followed by saponification of the phosphorized fatty body with a suitable metal compound such as an oxide or hydroxide, although additives having considerable merit may be prepared by first saponifying the fatty body with the metal compound and the metal soap subsequently reacted with phosphorus sulfide. The saponification may be readily carried out at relatively low elevated temperatures such as temperatures of the order of 130 to 250° F. It has been found that greater ease of preparation and more uniform products are obtained when crystalline metallic hydroxides containing water of hydration are employed as a source of metal in the saponification reaction. For example, hydrated barium hydroxide, $Ba(OH)_2.8H_2O$, has been found to be superior to barium oxide or anhydrous barium hydroxide in the preparation of the desired additives.

In preparing additives in accordance with this invention, a fatty body such as wool grease is heated sufficiently to make the wool grease quite fluid (about 160° F.) and a suitable phosphorus sulfide such as phosphorus sesquisulfide, $P_4S_3$, added with continuous agitation. The temperature is slowly increased to approximately 220° F. and maintained at this temperature with continuous agitation until the $P_4S_3$ is completely reacted with the wool grease as indicated by a copper strip corrosion test. The copper strip corrosion test is conducted by immersing a polished copper strip in the reaction mixture at reaction temperature for three minutes. A "peacock" or iridescent strip is considered satisfactory whereas a black or gray strip is not satisfactory. In making the corrosion test caution should be exercised to make sure that the reactants have passed through the stage at which a gray or black copper strip is obtained since in some instances copper strip corrosion tests which are satisfactory are obtained for very short periods such as within about fifteen minutes, subsequent to the mixing of fatty body and phosphorus sulfide. Such corrosion tests do not indicate completion of the reaction of the phosphorus compound and further heating is necessary during which time black or gray copper strip corrosion tests will be obtained and subsequently the aforementioned "peacock" colored strip is obtained which is an indication of a satisfactory completion of the reaction. The reaction mixture is preferably not allowed to exceed 240° F. temperature until the exothermic heat of reaction is substantially complete. Phosphorized fatty bodies in which the temperature exceeds about 240° F. prior to completion of the exothermic heat of reaction are not uniform in quality and in general show a much lower content of chemically combined phosphorus and sulfur for a given amount of phosphorus sulfide employed in the reaction mixture. After the exothermic heat of reaction has subsided, the reaction temperature may be carried to temperatures of the order of 300° F. or even 400° F., although temperatures of 215 to 240° F. have been found to produce most uniform results.

The time required for effecting satisfactory chemical reaction between the phosphorus sulfide and fatty body will vary considerably depending upon such factors as reaction temperature, the particular fatty body employed, the particular phosphorus sulfide which is used, the presence of oxygen or air in the reaction mixture and the relative proportions of reacting materials. It has been found that if air is blown through the mixture during reaction, about one hour is required for satisfactory reaction of a mixture of wool grease and 5% by weight of phosphorus sesquisulfide whereas six to ten hours are generally required to complete the reaction without air blowing.

As a specific example (1), 1900 parts by weight of wool grease having the following properties—saponification No. 100 to 115; iodine No. 41 to 46; acetyl value 29 to 41, was heated to a temperature of approximately 160° F. and 100 parts by weight of commercial grade phosphorus sesquisulfide, $P_4S_3$, slowly added with continuous agitation. The temperature was gradually increased to 220 to 230° F. and maintained at this temperature until a satisfactory copper strip corrosion test was obtained. This required a period of six hours. The phosphorized wool grease was filtered to remove small amounts of solid impurities and upon analysis the filtered material was found to contain 1.68% sulfur and 2.3% phosphorus. One part by weight of the phosphorized wool grease was mixed with 2 parts by weight of 180 viscosity at 100 Pennsylvania neutral oil and the mixture brought to a temperature of 225 to 235° F. 0.185 parts by weight of crystalline barium hydroxide, $Ba(OH)_2.8H_2O$, was slowly added with continuous agitation. A considerable amount of frothing occured due to evolution of steam. The mixture was maintained at the aforementioned temperature until all frothing had ceased and heating was continued for approximately ½ hour thereafter to make certain that the saponification reaction had terminated. The time required for reaction of the barium hydroxide was one hour. The saponified product was filtered to remove small amounts of solid by-product materials thereby producing a homogeneous, light brown product. Analysis of the filtered material showed that it contained in combined form, 2.7% barium, 0.55% phosphorus and 0.34% sulfur. The theoretical content of these materials based on the amounts of reactants employed is 2.6% barium, 0.74% phosphorus and 0.54% sulfur. The filtered saponified concentrate was a lightcolored, slightly viscous liquid having a Saybolt viscosity at 100° F. of 457 seconds.

In another example (2) 1500 grams of wool grease and 80 grams of phosphorus sequisulfide were mixed together and the mixture heated to 230° F. while being constantly stirred. After the reaction mixture had attained a temperature of 230° F. heating was discontinued and air was blown through the mixture at the rate of 45 cubic feet per hour for a period of one hour. The mixture was continuously stirred during the entire time. The rate of air blowing was sufficient to maintain the reaction mixture at 230° F. without application of heat. At the end of the one hour blowing period the reaction was complete, as evidenced by the stoppage of fuming and the failure to obtain a temperature increase with an increase in rate of air flow.

The reaction mixture was then filtered at 230° F. and analyzed for sulfur and phosphorus content. It was found to have a sulfur content of 1.46% by weight and a phosphorus content of 2.23% by weight.

One part of the filtered reaction product was mixed with 2 parts by weight of Mid-Continent Neutral having a Saybolt viscosity of 200 at 100° F., and with barium hydroxide, ($Ba(OH)_2.8H_2O$), in an amount equal to .09 part by weight of barium. The mixture was slowly heated to a temperature of 225 to 235° F., with continuous agitation in order to saponify the reaction product in the same manner as described in example (1). After saponification was complete heating was continued at a temperature of approximately 340° F. for a period of 45 minutes in order to insure completion of the saponification reaction and to stabilize the product. The resulting saponified product showed the following analysis:

| | |
|---|---|
| Per cent barium by weight | 2.62 |
| Per cent sulfur by weight | 0.41 |
| Per cent phosphorus by weight | 0.64 |

In another example (3), sperm oil was phosphorized with phosphorus sesquisulfide with air blowing in the same manner as described with reference to wool grease in example (2). Separate portions of the phosphorized sperm oil reaction product were saponified with zinc and barium hydroxides in the manner heretofore described, so that resulting saponified product contained 2.8% of the metal.

This concentrate of barium soap of phosphorized wool grease dissolved in neutral oil is readily soluble in mineral oil and is easily incorporated in lubricating compositions, particularly mineral lubricating oils, in widely varying proportions depending upon the particular service to which the oil is to be put and the composition of the soap. Generally speaking, that amount of soap is employed which will produce lubricant compositions containing from about 0.005% to .5% by weight of metal, although larger amounts such as 1% by weight of metal, are satisfactory. In incorporating soaps of the invention into crank case oils used in internal combustion engines, consideration must be given to the matter of thickening of the oil when large proportions are employed. Excessive viscosity increase must be avoided. In specific examples, approximately 3.1% by weight of barium soap additives increased the Saybolt viscosity of a sample of Pennsylvania S. A. E. 10 motor oil from 190 to 201 at 100° F. and increased a sample of S. A. E. 30 motor oil from 204 to 209 at 130° F. Extremely large proportions of soaps may also contribute to the formation of combustion chamber deposits due to the non-volatile nature of the metallic compounds formed as a result of exposure of portions of the oil to combustion conditions in the combustion chamber.

In saponifying the phosphorized fatty bodies with metal compounds, it is preferred to use proportions of the metal compound which are insufficient to completely saponify the phosphorized fatty body, since superior results are obtained with those compositions in which a substantial amount of unsaponified or unsaponifiable phosphorized fatty body is present. No satisfactory explanation of this phenomenon has been found. Most satisfactory results have been obtained when approximately ½ to ¾ of the saponifiable content of the original fat, as determined by the A. S. T. M. procedure for saponification number, is reacted with metallic compound to form the metal soap.

Particularly satisfactory metallic soaps are prepared from phosphorized fatty bodies which are phosphorized with phosphorus sulfides in amounts ranging from 0.3% to 5% by weight of phosphorus based on the fatty body, although amounts of phosphorus sulfides have been used in which the proportion of phosphorus amounted to as much as 10% based on the fatty material employed. Ordinarily, best results are obtained when approximately 1.5% to 4% of phosphorus in the form of phosphorus sulfide is used in the phosphorizing step.

In order to demonstrate the ability of metal soaps of phosphorized fatty bodies for inhibiting bearing corrosion, mineral oil blends containing varying proportions of soaps prepared in accordance with example (1) were subjected to Underwood corrosion tests. This test was chosen inasmuch as experience with various corrosion tests has indicated that the Underwood machine test results correlate actual service results very closely. The Underwood test is described in an article entitled, "Automotive bearing materials and their application," by A. F. Underwood, Journal of Society of Automotive Engineers, vol. 43, pages 385 to 392, September 1938. A series of such tests was run on 180 viscosity at 100 Pennsylvania neutral oil and on separate samples of the same oil to which was added various amounts of a number of different metal soaps of phosphorized fatty bodies. These results are shown in Table I.

TABLE I

*Underwood tests*

| Sample No. | Metal | Phosphorus compound reacted with fatty body | Per cent phosphorus compound | Additive | | Fatty body | Ag-Cd bearing loss, grams | CuPb bearing loss, grams | Hours run | Neut. No. | Sludge | | |
|---|---|---|---|---|---|---|---|---|---|---|---|---|---|
| | | | | Per cent metal | Per cent phosphorized fat | | | | | | Naphtha insoluble, per cent | $CHCl_3$ soluble, per cent | Propane insoluble, per cent |
| 1 | Straight oil | O | 0 | 0 | 0 | | 1.5779 | 0.1733 | 10 | 18.70 | 5.08 | 4.64 | 10.25 |
| 2 | Zinc | $P_4S_3$ | 3 | [1] 0.058 | 3 | Wool grease | 0.0026 | 0.0905 | 10 | 1.04 | .50 | .36 | 1.50 |
| 3 | Calcium | do | 3 | [1] 0.035 | 3 | do | 0.0012 | 0.0619 | 10 | .81 | .25 | .19 | 2.35 |
| 4 | Barium | do | 5 | 0.121 | 3 | Sperm oil | 0.0104 | 0.0165 | 10 | .84 | .93 | .31 | .79 |
| 5 | do | do | 7 | 0.121 | 3 | do | 0.0034 | 0.0642 | 10 | .84 | .93 | .43 | .73 |
| 6 | do | $P_2S_5$ | [2] 10 | 0.121 | 3 | Wool grease | 0.0072 | 0.0255 | 10 | .81 | .39 | .15 | .80 |
| 7 | do | $P_2O_5$ | [2] 6.5 | 0.121 | 3 | do | 0.0699 | 0.1141 | 10 | .60 | .76 | .11 | .40 |
| 8 | do | $PCl_5$ | 10 | 0.121 | 3 | do | 0.5700 | 0.1724 | 5 | 4.30 | .88 | .74 | 3.54 |
| 9 | do | do | 20 | 0.121 | 3 | do | 0.3570 | 0.2134 | 5 | | | | |
| 10 | do | $P_4S_3$ | 5 | 0.121 | 3.5 | do | 0.0020 | 0.0207 | 10 | 1.40 | .44 | .26 | .47 |
| 11 | do | do | 7 | 0.06 | 1.75 | do | 0.0000 | 0.0359 | 10 | 1.30 | .49 | .20 | .59 |

[1] Equivalent to 0.121% barium.
[2] Equivalent to phosphorus content to 5% $P_4S_3$.

A set of samples similar to those employed in the Underwood tests was prepared and tested for detergency and anti-oxidant properties under actual conditions of use in an internal combustion engine. These tests were carried out in Lauson engines and are known as "Lauson varnish tests." In these tests the oil with or without additive is used as a crank case oil in a single cylinder Lauson engine operated under the following conditions: Duration of test—25 hours; speed—1600 R. P. M.; load—1 kw.; jacket temperature—170° F.; oil sump temperature—280° F.; piston clearance—0.004 to 0.006 inch; type of piston—cast-iron. At the conclusion of the test period, the pistons are removed for visual inspection of rings and overall cleanliness and from this inspection, a piston rating is assigned. The piston rating is based on an arbitrary merit scale of 1 to 5 which was established from the results of inspections of many pistons previously run under identical engine conditions using different grades of lubricants whereby to obtain pistons of five different degrees of cleanliness. The degree of cleanliness is arrived at by inspecting the amount of deposition on the piston rings, ring lands, piston skirt and under side of the piston. According to the scale, a piston rating of 5 is the best rating assigned. The data in Table II show the piston ratings obtained on the same 180 viscosity at 100 Pennsylvania neutral oil, as well as separate samples of the same oil containing varying amounts of additives prepared in accordance with this invention.

TABLE II

*Lauson varnish test*

| Sample No. | Metal | Phosphorus compound reacted with fatty body | Per cent phosphorus compound | Additive | | Kind of fat | Piston rating |
|---|---|---|---|---|---|---|---|
| | | | | Per cent metal | Per cent phosphorized fat | | |
| 1 | Straight oil | | | | | | 1 |
| 2 | Strontium | $P_4S_3$ | 7 | 0.154 | 3 | Wool grease | 4 |
| 3 | Magnesium | do | 7 | 0.042 | 3 | do | 5 |
| 4 | Calcium | do | 7 | 0.070 | 3 | do | 4 |
| 5 | Barium | do | 7 | 0.121 | 3 | Tallow | 3 |
| 6 | do | do | 7 | 0.121 | 3 | Menhaden oil | 5+ |
| 7 | do | do | 7 | 0.121 | 3 | Corn oil | 3 |
| 8 | do | do | 7 | 0.121 | 3 | Soya bean oil | 3+ |
| 9 | do | do | 7 | 0.242 | 1.26 | Oleic acid | 4+ |
| 10 | do | do | 7 | 0.121 | 0.64 | Lard oil | 4 |
| 11 | do | do | 7 | 0.580 | 3 | do | 5+ |
| 12 | do | $P_2S_5$ | [1] 10 | 0.121 | 3 | Wool grease | 3 |
| 13 | do | $P_2O_5$ | [1] 6.4 | 0.121 | 3 | do | 3+ |
| 14 | do | $PCl_5$ | 10 | 0.121 | 3 | do | 3 |
| 15 | do | $P_4S_3$ | 7 | 0.121 | 3 | do | 5+ |
| 16 | do | do | 5 | 0.060 | 3 | do | 4 |
| 17 | do | do | 7 | 0.242 | 3 | do | 5+ |

[1] Equivalent in phosphorus content to 5% phosphorus sesquisulfide.

In both Tables I and II the "Per cent phosphorus compound" heading shows the amount of phosphorus compound, based in the fatty body employed, that was reacted with the fatty body. The "Per cent metal" and "Per cent phosphorized fat" headings indicate the respective amounts of these materials in the finished lubricant composition, the total additive employed in each case being the sum of the figures in these two columns.

In Table I the "naphtha insoluble" is an indication of the amount of insoluble sludge formed by the oil during the test. The "chloroform soluble" portion indicates the varnish formation which took place during the test; and the neutralization or acid number is a measure of the total acidity of the oil.

The acid or neutralization number is determined in accordance with A. S. T. M. tentative method D188–27T.

The "naphtha insoluble," "chloroform soluble" and "soluble sludge" are determined as follows:

*Naphtha insoluble (insoluble sludge)*

Three grams of the oil is mixed in an Erlenmeyer flask with 100 cc. of A. S. T. M. precipitation naphtha, of the type specified in A. S. T. M. method D91–35. The oil and naphtha are thoroughly mixed and allowed to stand for three hours. The insoluble matter is then filtered through a tared Gooch porcelain crucible, previously prepared with an asbestos pad 1" thick and dried in an oven at 300° F. for 30 minutes. The insoluble residue is washed with 100 cc. A. S. T. M. naphtha and dried in an oven at 300° F. for thirty minutes, cooled and weighed. The increase in weight is "naphtha insoluble."

*Chloroform soluble*

The chloroform soluble is extracted from the dried and weighed "naphtha insoluble" residue by pouring successive portions of chloroform through the filter pad using light suction. 100 cc. of chloroform is generally sufficient but the extraction should be continued until the filtrate is colorless. (With heavy "naphtha insoluble" residues the chloroform is allowed to stand in the crucible without suction for a few minutes before each portion of the chloroform is drawn through the crucible.)

The residue is then dried in an oven at 300° F. for 30 minutes, cooled and weighed. The loss in weight is "chloroform soluble."

The solubility in chloroform of the residue from the "naphtha insoluble" determination is affected by the time and temperature of drying. For this reason, in order to secure check results in the "chloroform soluble" determination, the drying time and temperature, especially in the "naphtha insoluble" determination, should be carefully controlled.

It usually happens that in the Underwood Test there is no particular difficulty in filtering, regardless of whether the oils contain detergents or not. However, when these methods are applied to used crankcase oils it sometimes happens that oils which contain detergents will not give a clear filtrate. Under these conditions, the filtrate is refiltered through a second Gooch filter and the deposits from both crucibles added in reporting naphtha insoluble (and chloroform soluble).

*Propane insoluble (soluble sludge)*

The filtrate from the naphtha insoluble is concentrated to 20 cc. by evaporation and is transferred quantitatively to the extraction apparatus described in Industrial and Engineering Chemistry, April 15, 1939, page 183. The remaining naphtha is now completely removed from the oil sample by evaporation on a steam bath. The propane extraction is carried out as directed in the above-mentioned article. The propane insoluble material remaining is calculated in percentage and reported as soluble sludge.

From the data shown in Table I, it will be seen that the bearing corrosion and sludging tendency of the straight oil has been materially reduced by the incorporation of suitable additives. The silver-cadmium bearing corrosion loss with the straight 180 Pennsylvania neutral oil amounted to over 1.5 grams, whereas the losses obtained under the same test conditions when using separate samples of the same oil containing approximately 3% of the preferred type of additive compound in which the fat was treated with phosphorus sulfide, were of the order of 0.01 gram or less, most of the losses being below 0.007 gram. A similar improvement in the reduction of the copper-lead bearing losses is also shown. Furthermore, the sludge formation in the oil and development of acidity is greatly reduced by incorporation of the additives as shown by the neutralization number and sludge tests. It will be further noted from the data in this table that the soaps prepared from wool grease which had been phosphorized with phosphorus compounds other than a phosphorus sulfide, produced materially higher bearing losses than those soaps prepared from phosphorized wool grease in which the phosphorizing was effected by means of phosphorus sulfides and that the best results were obtained when phosphorus sesquisulfide was used as the phosphorizing agent.

The data in Table II clearly bring out the superior properties of oils containing metal soaps of phosphorus sulfide treated fatty bodies with respect to the ability of oils containing such soaps to retard fouling of pistons and sticking of piston rings. These data show that when the straight 180 Pennsylvania neutral oil was employed as the sump oil in Lauson engines under test conditions, a piston rating of 1 was obtained. This rating of 1 was obtained only by the use of an aluminum piston, since when using the usual cast-iron piston the oil deteriorated so rapidly that it was not possible to complete a test run of 25 hours. Separate samples of the same oil which contained approximately 3% or less of additives prepared in accordance with this invention, produced piston ratings materially above that of the straight oil, the ratings ranging from 3 to 5+, the latter being the highest rating obtainable on this scale. While all of the soaps of phosphorized fats shown in Table II materially improved the piston rating, as compared to the straight oil, it will be noted that the best ratings were obtained on those soaps which were prepared from fats that were phosphorized with phosphorus sulfide. Note particularly the excellent piston ratings obtained on samples 6, 11 and 15, which were prepared from menhaden oil, lard oil and wool grease, respectively, all of which were phosphorized by reaction with phosphorus sesquisulfide, thus clearly showing the unusually superior properties of the preferred materials of this invention.

Lauson varnish tests were also obtained on additional samples of the same neutral oil containing approximately 3% by weight of additives prepared by phosphorizing wool grease with 7% by weight of phosphorus sesquisulfide and reacting separate portions of phosphorized wool grease with hydrated crystalline barium hydroxide and diphenyl tin oxide. The tin and barium soaps were incorporated in 180 viscosity Pennsylvania neutral oil in such amounts as to produce the following composition:

| | Per cent by weight |
|---|---|
| Neutral oil | 96.173 |
| Barium soap | 3.242 |
| Tin soap | 0.585 |

Based on the total composition, the barium soap contained 0.242% by weight of barium and the tin soap 0.049% by weight of tin. The piston rating obtained from a test of this material was 5+, showing that such soaps are highly efficacious for inhibiting the oxidation deterioration and ring sticking properties of mineral lubricating oils.

A further indication of the unusual properties of additives within the scope of this invention for improving the properties of mineral lubricating oils, may be obtained by comparing the Lauson varnish test and Underwood test data in Table III with tests of the preferred materials shown in Tables I and II. The data in Table III were obtained on separate samples of the same Pennsylvania neutral oil used to obtain the data in Table II and which contained similar amounts of barium soaps of fats which were sulfurized with elemental sulfur instead of being phosphorized with phosphorus sulfide. Data on soaps of sulfurized fats are shown in Table III.

TABLE III

*Lauson Varnish Test*

| Sample No. | Per cent elemental sulfur | Additive | | Kind of fat | Piston rating |
|---|---|---|---|---|---|
| | | Per cent metal | Per cent treated fat | | |
| 1 | (1) | 0 | 0 | 0 | 1 |
| 2 | 7.5 | 0.121 | 3 | Prime lard oil | 3 |
| 3 | 3.04 | 0.121 | 3 | Wool grease | 3 |
| 4 | 3.04 | 0.121 | 1 | do | 2 |
| 5 | 7.0 | 0.121 | 3 | do | 2+ |

*Underwood Tests*

| Sample No. | Per cent elemental sulfur | Additive | | Fat | Ag-Cd bearing loss | CuPb bearing loss | Hours run |
|---|---|---|---|---|---|---|---|
| | | Per cent metal | Per cent treated fat | | | | |
| 1 | (1) | 0 | 0 | | 1.5779 | 0.1733 | 10 |
| 2 | 3 | 0.121 | 3 | Wool grease | 0.5945 | 0.2015 | 10 |
| 3 | 7 | 0.121 | 3 | do | 0.2214 | 0.1108 | 5 |
| 4 | 7.5 | 0.121 | 3 | Prime lard oil. | 0.2044 | 0.1040 | 5 |

[1] Straight oil.

The sulfurized fatty bodies used in these tests were sulfurized by reacting prime lard oil or wool grease with the indicated amounts of elementary sulfur at a temperature of approximately 325° F. until a satisfactory copper strip corrosion test was obtained. The sulfurized fat was then saponified with $Ba(OH)_2.8H_2O$ in the manner previously described in Example 1 in connection with the saponification of the phosphorus sulfide treated fats to produce the indicated amounts of barium in the finished additive. It will be seen that soaps of the sulfurized fatty bodies improved the piston rating over the straight oil in the Lauson varnish tests but that the improvement was not nearly as great as when similar soaps of phosphorized, particularly phosphorus sesquisulfide treated fats were incorporated in the mineral oil. Note particularly Examples 15 and 16 of Table II. The soaps of the phosphorus sesquisulfide treated fats gave piston ratings of 5+, whereas the soaps of the sulfurized fats gave engine ratings from 2 to 3. A similar contrast exists in the results obtained on the Underwood tests, for although the silver-cadmium and copper-lead bearing losses of the straight oil were materially reduced by incorporation of barium soap of sulfurized wool grease or prime lard oil, the corrosion was still far greater than that obtained by incorporating barium soap of phosphorized wool grease or phosphorized prime lard oil in the same mineral oil.

Another test which has been devised for the evaluation of motor oil additives under conditions of more severe service is the Lauson ring-sticking test. This test is carried out in the same single cylinder Lauson engines that are employed in the Lauson varnish test. However, the operating conditions are much more severe as may be seen from the following data showing the conditions maintained throughout the test:

| | | |
|---|---|---|
| Duration of test | hours | 25 |
| R. P. M., 1800; Load | kw | 1 |
| Jacket temperature | ° F | 400 |
| Sump temperature | ° F | 225 |
| Piston clearance | inches | 0.007 |
| Type piston | | Aluminum |

The foregoing conditions have been found to closely approximate the conditions to which lubricating oils are subjected in modern high speed Diesel engines. At the completion of the 25-hour test period, the piston is removed and each of the three piston rings carefully examined for overall cleanliness and a numerical merit rating assigned, a number 1 rating for a ring indicating that the ring is stuck, whereas a number 5 rating for a ring indicates a sufficiently clean condition that when the piston is carefully moved from a vertical to horizontal position, the ring will fall into the ring groove under its own weight. The condition of the under side of the piston and the piston skirt are also carefully examined and similar numerical ratings assigned. From an average of the numerical ratings an over-all piston rating is obtained. Table IV shows the Lauson ring-sticking test results obtained on a standard grade of S. A. E. 30 motor oil containing barium soap additives prepared from phosphorus sesquisulfide treated wool grease.

Table IV

*Lauson ring-sticking tests*

| No. | Per cent additive | Per cent barium in oil composition | $P_4S_3$ used in preparing additive | Fatty body | Over-all piston rating | Piston ring ratings | | |
|---|---|---|---|---|---|---|---|---|
| | | | | | | Compression | Compression | Oil |
| 1 | 0 | 0 | 0 | 0 | 2+ | 3 | 1 | 3 |
| 2 | 3.121 | 0.121 | 5 | Wool grease. | 4+ | 4 | 4 | 4 |
| 3 | 3.242 | 0.242 | 5 | do | 4+ | 4 | 5 | 5 |

The S. A. E. 30 motor oil used in all of the above tests had the following specifications:

| | | |
|---|---|---|
| Gravity | | 24 |
| Flash | ° F | 445 |
| Fire | ° F | 500 |
| Saybolt viscosity at 100° F | | 525–585 |
| Saybolt viscosity at 130° F | | 220–240 |
| Saybolt viscosity at 210° F | | 60–62 |
| Pour test—maximum | | 25 |
| Carbon residue | per cent | 3 |
| N. P. A. color—maximum | | 7 |

The barium soaps of phosphorus sesquisulfide treated wool grease shown in Examples 2 and 3 of Table IV were prepared by the same method as previously described in Example 1. It will be seen from the data in Table IV that the oil without any additive deposited gum or varnish on the Lauson piston to such an extent to produce a piston rating of 2+. One of the compression rings was completely stuck as indicated by a rating of 1. When small amounts of barium soap of phosphorus sesquisulfide treated wool grease were added to the same motor oil, the overall piston ratings obtained were 4+. The individual piston ring ratings were either 4 or 5. This clearly shows that under conditions of severe service, the barium soaps of phosphorus sesquisulfide treated fat such as wool grease are highly effective additives for improving mineral lubricating oils under conditions of severe service.

An indication of the pour depressing properties of metal soaps of phosphorized fatty bodies is given in Table V.

Table V

| Phosphorized fatty body | Additive | | |
|---|---|---|---|
| | Per cent phosphorized fatty body | Per cent barium | Pour, ° F. |
| Wool grease reacted with 5% $P_4S_3$ | 3.0 | 0.121 | 0 |
| Do | 1.75 | 0.06 | −5 |
| Do | 0.87 | 0.06 | +5 |
| Blank | None | | +30 |

The tests shown in the foregoing table were obtained on samples of the same 180 Vis Pennsylvania neutral oil that was employed in the tests shown in Tables I, II and III. The straight oil had a pour test of +30° F., whereas the oil containing 0.93% of the barium soap of phosphorus sesquisulfide treated wool grease had a pour test of +5° F., or a reduction in pour of 25° F. Similarly, when 1.81% of the same barium soap was incorporated in another sample of the same oil, the pour test was reduced to −5° F., or a reduction of 35° F.

Further tests were made on a Lauson engine with lubricating oils prepared in accordance with Examples 1, 2 and 3 in which sufficient Mid-Continent neutral, having a viscosity of 180 seconds Saybolt at 100° F., was added to adjust the metal content to the equivalent of 0.242% by weight of barium. The Lauson engine tests were run under the following conditions:

| | |
|---|---|
| Jacket temperature | ° F. 170 |
| Sump temperature | ° F. 280 |
| Load | kw. 1.3 to 1.4 |
| R. P. M. | 1600 |
| Duration of tests | hours 25 |

The results of this test showed that the barium soaps of wool grease phosphorus sesquisulfide and of sperm oil phosphorus sesquisulfide were substantially the same when prepared either with or without the air-blowing. The zinc-sperm oil-phosphorus sesquisulfide product did not give the over-all engine cleanliness of the other products, but the bearings showed less corrosion with the zinc sperm oil phosphorus sesquisulfide product than with the other products.

It will be seen, therefore, that the metal soaps of fatty bodies which have been reacted with phosphorus sulfide have unusual properties in imparting corrosion resisting properties, resistance to sludge and varnish formation and reducing the pour test as well as generally improving the oils with respect to their use in modern internal combustion engines.

While the invention has been described hereinabove with reference to various preferred forms, proportions and embodiments, and with reference to various specific examples, it will be understood that the invention is not limited to the details of such illustrative embodiments or examples but may be practiced by various methods within the scope of the claims hereinafter made.

It is claimed:

1. Method of preparing a lubricant additive which comprises reacting wool grease with phosphorus sesquisulfide, in an amount equivalent to 1.5 to 4% by weight of phosphorus based on the wool grease, at a temperature not exceeding 240° F. until the reaction product has good copper strip corrosion, then saponifying it with crystalline barium hydroxide in amount sufficient to saponify at least 50% of the wool grease-phosphorus sesquisulfide reaction product but insufficient to completely saponify it.

2. A lubricating oil comprising a mineral lubricating oil and the soap formed by saponifying with hydrated barium hydroxide at least 50% of but not the entire saponifiable content of the product resulting from chemically reacting wool grease with phosphorus sesquisulfide in an amount equivalent to 1.5 to 4% of phosphorus based on the wool grease, at a temperature of approximately 240° F. until the exothermic reaction has subsided and continuing the reaction at a temperature not in excess of 400° F. until the product gives a good copper strip test, the amount of soap in the lubricating oil being equivalent to 0.005 to 0.5% by weight of barium.

3. Method of preparing a lubricant additive which comprises reacting wool grease with phosphorus sesquisulfide, in an amount equivalent to 1.5 to 4% by weight of phosphorus based on the wool grease, at a temperature not exceeding 240° F. until the reaction product has good copper strip corrosion, then saponifying it with a compound selected from the group consisting of the oxide and hydroxide of zinc, barium, calcium, strontium and magnesium in amount sufficient to saponify at least 50% of the wool grease-phosphorus sesquisulfide reaction product but insufficient to completely saponify it.

4. A lubricating oil comprising a mineral lubricating oil and the soap formed by saponifying with a compound selected from the group consisting of the oxide and hydroxide of zinc, barium, calcium, strontium and magnesium at least 50% of but not the entire saponifiable content of the product resulting from chemically reacting wool grease with phosphorus sesquisulfide in an amount equivalent to 1.5 to 4% of phosphorus based on the wool grease, at a temperature of approximately 240° F. until the exothermic reaction has subsided and continuing the reaction at a temperature not in excess of 400° F. until the product gives a good copper strip test, the amount of soap in the lubricating oil being equivalent to 0.005 to 0.5% by weight of barium.

5. The method of preparing a lubricant additive which comprises reacting a substance selected from the group consisting of non-drying animal and vegetable oils, fats and waxes with a phosphorus sulfide in an amount equivalent to 1.5 to 4% by weight of phosphorus based on said substance at a temperature not exceeding 240° F. until the reaction product has good copper strip corrosion, then saponifying it with a compound selected from the group consisting of the oxides and hydroxides of zinc, barium, calcium, strontium and magnesium in amounts sufficient to saponify at least 50% of said reaction product but insufficient to completely saponify it.

6. A lubricant comprising a soap formed by saponifying in the presence of a mineral lubricating oil by means of a compound of a metal selected from the group consisting of zinc, barium, calcium, strontium and magnesium, at least 50% but not the entire saponifiable content of the product resulting from chemically reacting a substance selected from the group consisting of non-drying animal and vegetable oils, fats and waxes with a phosphorus sulfide in an amount equivalent to 1.5 to 4% by weight of phosphorus, based on said substance, at a temperature of approximately 215–240° F. until the reaction product has a good copper strip corrosion.

7. The method in accordance with claim 1 in which the reaction mixture is blown with air during the reaction period.

8. The method in accordance with claim 3 in which the reaction mixture is blown with air during the reaction period.

9. The method in accordance with claim 5 in which the reaction mixture is blown with air during the reaction period at a sufficient rate to maintain the desired reaction temperature.

10. In a method of preparing a lubricant additive the step comprising reacting a substance selected from the group consisting of non-drying animal and vegetable oils, fats and waxes with phosphorus sesquisulfide at a temperature sufficient to promote reaction and in the presence of sufficient free oxygen-containing gas to maintain the desired reaction temperature without application of heat and partially saponifying the resulting product with a suitable metal compound.

11. The step in accordance with claim 10 in which the temperature is not substantially above 240° F.

12. The step in accordance with claim 10 in which the substance is wool grease.

13. The step in accordance with claim 10 in which the substance is sperm oil.

14. In a method for preparing a lubricant additive the step comprising heating a mixture of a substance selected from the group consisting of non-drying animal and vegetable oils, fats and waxes and phosphorus sesquisulfide in an amount equivalent to 1.5 to 4% by weight of phosphorus based on said substance to a temperature not substantially above 240° F. but sufficiently high to enable the temperature to be maintained without application of heat by blowing air through the mixture, blowing air through the mixture at a rate sufficient to maintain the desired temperature until the reaction is substantially completed and partially saponifying the resulting product with a suitable metal compound.

15. The steps in accordance with claim 14 in which the mixture is heated to a temperature of about 230° F.

16. The steps in accordance with claim 14 in which the substance is wool grease.

17. The steps in accordance with claim 14 in which the substance is sperm oil.

18. The method of preparing a lubricant additive comprising heating a mixture of a substance selected from the group consisting of non-drying animal and vegetable oils, fats and waxes and phosphorus sesquisulfide in an amount equivalent to 0.3 to 10 per cent by weight of phosphorus based on said substance to a temperature between approximately 215° and 240° F. sufficiently high to enable the mixture to be maintained at reaction temperature by means of air blowing alone, blowing air through said mixture at a rate sufficient to maintain reaction temperature until reaction is substantially completed and partially saponifying the reaction product with a suitable metal compound.

NORMAN D. WILLIAMS.
WILLIAM J. BACKOFF.

REFERENCES CITED

The following references are of record in the file of this patent:

UNITED STATES PATENTS

| Number | Name | Date |
|---|---|---|
| 2,142,998 | Chittick | Jan. 10, 1939 |
| 2,211,231 | Henderson | Aug. 13, 1940 |
| 2,257,750 | Lincoln | Oct. 7, 1941 |
| 2,257,751 | Lincoln | Oct. 7, 1941 |
| 2,264,319 | Lincoln | Dec. 2, 1941 |
| 2,274,025 | Yule | Feb. 24, 1942 |
| 2,331,923 | Musselman | Oct. 19, 1943 |
| 2,343,831 | Osborne | Mar. 7, 1944 |
| 2,383,495 | Musselman | Aug. 28, 1945 |